W. BRUHN.
PRESS FOR FLOOR BOARDS.
APPLICATION FILED SEPT. 4, 1909.

951,557.

Patented Mar. 8, 1910.

UNITED STATES PATENT OFFICE.

WILHELM BRUHN, OF ALT-HEIKENDORF, NEAR KIEL, GERMANY.

PRESS FOR FLOOR-BOARDS.

951,557.  Specification of Letters Patent.  Patented Mar. 8, 1910.

Application filed September 4, 1909. Serial No. 516,270.

*To all whom it may concern:*

Be it known that I, WILHELM BRUHN, carpenter, a subject of the German Emperor, residing at Alt-Heikendorf, near Kiel, Germany, have invented new and useful Improvements in Presses for Floor-Boards, of which the following is a specification.

The object of the present invention is a tool serving to press the floor boards quickly and tightly together before they are nailed down to the joists.

The work is quiet and rapid, all hammering in using clamps or pins for a provisional tightening being unnecessary so that unnecessary vibration will not injure a ceiling made ready below.

Figure 1:
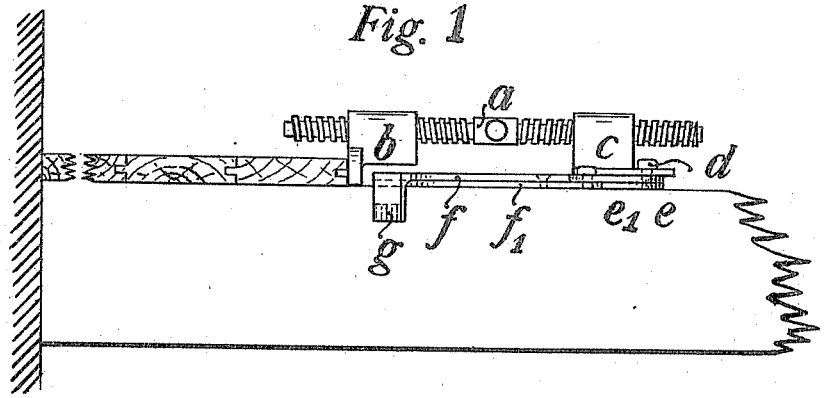
Figure 2:
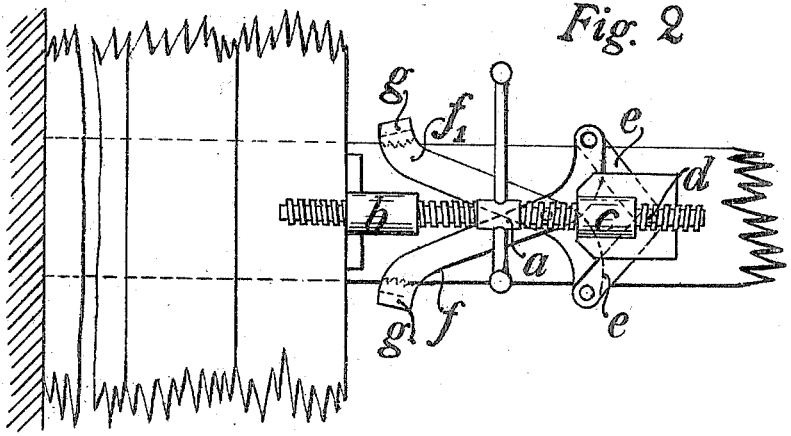
Figure 3:
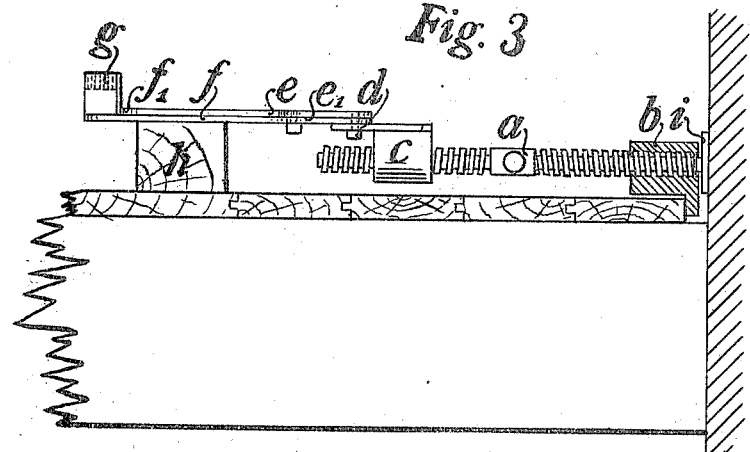

In the accompanying drawing Figure 1 shows the new implements in side elevation. Fig. 2. is a plan view. Fig. 3. shows the same in another position used for pressing home the last edge boards.

A screw spindle $a$ with right and left hand thread acts upon the nuts $b$ and $c$, the nut $b$ having a depending projection which is used as a clamping finger as shown. The nut $c$ is provided with a pivot pin $d$ to which are connected the links $e$ and $e^1$ and levers $f$ $f'$, which latter cross each other on a pin, common to both. The ends of the levers are bent downwardly and are provided with teeth, forming the jaws $g$ and $g'$. The spindle is provided with any convenient means for turning the same, and when the tool is placed upon a joist as in Figs. 1 and 2, the nut $c$ will be made to travel till the teeth $g$ $g'$ have firmly gripped the sides of the joist. Then the nut $c$ becomes stationary and a further revolution of the screw spindle will press the nut $b$ with its clamping finger tightly against the edge of the tongued and grooved or other floor boardings, which will be nailed down subsequently. For the last strips near the wall the tool is turned upside down as shown in Fig. 3. The clamping finger of the nut $b$ attacks the edge of the boarding with the rear side and a cleat $h$ is placed under the shank of the levers $f$ $f'$ only to support them and to hold them in place. In this instance the nut $c$ does not work at all and the opposite end of the spindle with the nut $b$ is acting alone, the end of the spindle pressing against the wall. Therefore it is preferable to put a metal plate $i$ against the wall in front of the spindle as shown.

I claim as my invention.

1. A tool for pressing floor boards together, composed of a spindle with right and left hand thread and of nuts, one provided with a clamping finger having acting front and rear faces, the other provided with a pivot, carrying means for clamping the tool to the sides of a joist substantially as described.

2. A tool for pressing floor boards together, composed of a spindle with right and left hand thread and of nuts, one provided with a clamping finger having acting front and rear faces, the other provided with a pivot carrying links and pivotally connected levers with gripping jaws at the ends as described and for the purpose set forth.

In testimony whereof I affix my signature.

WILHELM BRUHN.

In the presence of—
JULIUS RÖPKE,
HUGO VOLQUART.